W. H. H. MILLER.
Car Coupling.

No. 29,806.

Patented Aug. 28, 1860.

Witnesses:
J. A. Montgomery
J. H. Pollock

Inventor:
W. H. H. Miller

UNITED STATES PATENT OFFICE.

WILLIAM H. H. MILLER, OF WILLIAMSPORT, PENNSYLVANIA.

RAILROAD-CAR COUPLING.

Specification of Letters Patent No. 29,806, dated August 28, 1860.

*To all whom it may concern:*

Be it known that I, W. H. H. MILLER, of Williamsport, in the county of Lycoming and State of Pennsylvania, have invented a new and useful Machine for Self-Acting or Self-Uncoupling Car-Couplings; and I do hereby declare that the following is a full, clear, and exact description of the construction and operation of the same, reference being had to the annexed drawings, making a part of this specification, in which—

Figure 1:
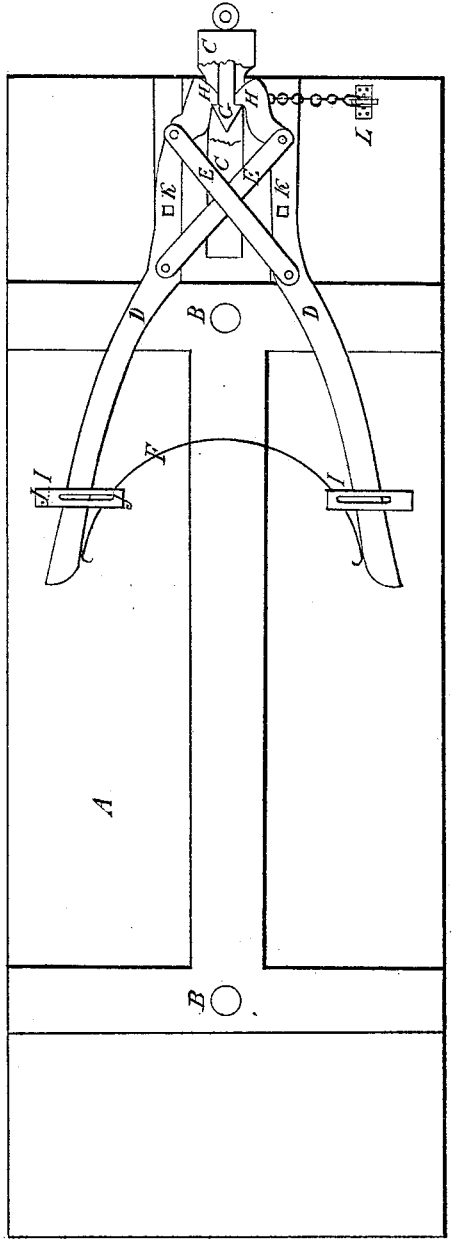
Figure 2:
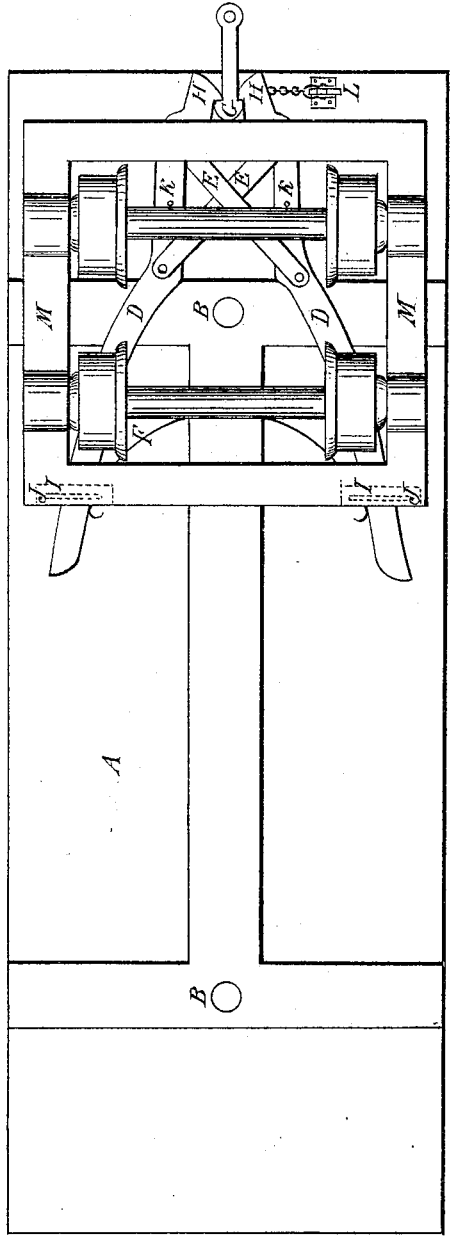
Figure 3:
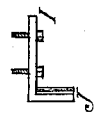

Figure 1 is a plan view of the coupling as attached to a car and as seen from below; Fig. 2 is a plan view of the same with a truck attached as seen from below; and Fig. 3 is a view of the knee which by being attached to the truck can cause the cars to uncouple when one or more is thrown from the track.

In these figures each letter so often as it occurs refers to the same part.

A is the bottom of the car, B timbers with holes for center pins for the trucks, C the bumper or draw head with a portion cut off to show other parts, D the levers which clasp the coupling hook, E the connecting rods giving each lever the same motion, F the spring operating on the levers and causing them to clasp the hook, G the coupling hook, H the hooks on the levers, I the knees which are attached to the truck on the side next the car bottom with arms projecting outside of the levers and coming in contact with them and operating them when the truck is thrown sufficiently out of line; K the bolts attaching the levers to the timbers of the car bottom, L the lever for uncoupling the car by hand, M the truck frame.

The nature and operation of my invention will be more fully understood by supposing that the truck is thrown out of line with the car, when it is evident the knees I or one of them will come in contact with one of levers D and by forcing it toward the center of the car open the jaws; it is also evident that either truck being thrown from the track will throw the car out of line with the trucks and uncouple the car. The knees I can be so adjusted as to allow for any curvature of road—but so that any greater curvature will cause the car to be uncoupled.

What I claim as my invention and desire to secure by Letters Patent is—

The employment of the hooked levers D H D H centered at K K and the connecting links E E between them on the truck, and the adjustable knees I I on the body of the car arranged to operate together substantially as herein described.

W. H. H. MILLER.

Witnesses:
 J. A. MONTGOMERY,
 I. H. POLLOCK.